US011029928B2

(12) United States Patent
Webb

(10) Patent No.: US 11,029,928 B2
(45) Date of Patent: *Jun. 8, 2021

(54) COMPUTER CODE MAPPING AND VISUALIZATION

(71) Applicant: Code Walker L.L.C., Houston, TX (US)

(72) Inventor: Chilton Webb, San Antonio, TX (US)

(73) Assignee: Code Walker L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/628,936

(22) PCT Filed: Jul. 6, 2018

(86) PCT No.: PCT/US2018/041088
§ 371 (c)(1),
(2) Date: Jan. 6, 2020

(87) PCT Pub. No.: WO2019/010415
PCT Pub. Date: Jan. 10, 2019

(65) Prior Publication Data
US 2020/0218520 A1    Jul. 9, 2020

Related U.S. Application Data

(60) Provisional application No. 62/529,201, filed on Jul. 6, 2017.

(51) Int. Cl.
*G06F 11/30* (2006.01)
*G06F 8/41* (2018.01)
(Continued)

(52) U.S. Cl.
CPC ............. *G06F 8/427* (2013.01); *G06F 8/75* (2013.01); *G06F 11/302* (2013.01); *G06F 11/323* (2013.01)

(58) Field of Classification Search
CPC .. G06F 11/36; G06F 11/3664; G06F 11/3668; G06F 11/366; G06F 11/0703
(Continued)

(56) References Cited

U.S. PATENT DOCUMENTS 5,371,747 A * 12/1994 Brooks ............... G06F 11/3624
714/38.1
6,226,787 B1 * 5/2001 Serra ................... G06F 11/3664
714/E11.217
(Continued)

FOREIGN PATENT DOCUMENTS

WO    2019010415    1/2019

OTHER PUBLICATIONS

International Search Report and Written Opinion for International Patent Application No. 2019010415 dated Jul. 6, 2018.

*Primary Examiner* — Kamini B Patel
(74) *Attorney, Agent, or Firm* — Tumey L.L.P.

(57) ABSTRACT

The present disclosure is related to a software program comprising a source code parser configured to read a source code and interpret each function in the source code. In addition, the program generates meta-data about each function. The code parser may weight each function based on the complexity of the calls to each function to generate weighted meta-data. A visualization program may interpret the weighted meta-data and display an interactive visualization to a user.

10 Claims, 4 Drawing Sheets

(51) Int. Cl.
*G06F 8/75* (2018.01)
*G06F 11/32* (2006.01)

(58) Field of Classification Search
USPC ........................................................ 714/38.1
See application file for complete search history.

(56) References Cited

U.S. PATENT DOCUMENTS

| | | | | |
|---|---|---|---|---|
| 8,051,408 B1* | 11/2011 | Johnson | ................ | G06F 8/33 |
| | | | | 715/705 |
| 9,092,565 B2* | 7/2015 | Boxall | ................ | G06F 11/3628 |
| 2003/0061600 A1* | 3/2003 | Bates | ................ | G06F 11/3664 |
| | | | | 717/133 |
| 2007/0022407 A1 | 1/2007 | Givoni et al. | | |
| 2009/0222799 A1* | 9/2009 | Stewart | ................ | G06F 8/427 |
| | | | | 717/143 |
| 2009/0313613 A1* | 12/2009 | Ben-Artzi | ................ | G06F 8/51 |
| | | | | 717/137 |
| 2012/0246120 A1* | 9/2012 | Brooks | ................ | H04L 67/34 |
| | | | | 707/687 |
| 2012/0323940 A1* | 12/2012 | Davis | ................ | G06F 16/958 |
| | | | | 707/756 |
| 2012/0324295 A1* | 12/2012 | Horn | ................ | G05B 19/058 |
| | | | | 714/46 |
| 2013/0055223 A1* | 2/2013 | Xu | ................ | G06F 8/42 |
| | | | | 717/143 |
| 2013/0298110 A1* | 11/2013 | Boden | ................ | G06F 11/3676 |
| | | | | 717/125 |
| 2013/0326497 A1* | 12/2013 | Boxall | ................ | G06F 11/3632 |
| | | | | 717/175 |
| 2016/0110543 A1* | 4/2016 | Park | ................ | G06F 21/563 |
| | | | | 726/22 |
| 2016/0124724 A1* | 5/2016 | Gautam | ................ | G06F 11/3616 |
| | | | | 717/143 |
| 2017/0109933 A1* | 4/2017 | Voorhees | ................ | G06T 19/00 |
| 2018/0012145 A1* | 1/2018 | Maurya | ................ | G06N 5/022 |
| 2018/0089064 A1* | 3/2018 | Duer | ................ | G06F 11/323 |
| 2018/0157481 A1* | 6/2018 | Zessin | ................ | H04L 9/3239 |

* cited by examiner

COMPUTER CODE MAPPING AND VISUALIZATION

CROSS-REFERENCE TO RELATED APPLICATIONS

This application claims benefit of U.S. Provisional Application No. 62/529,201 filed Jul. 6, 2017, the entirety of which is incorporated herein by reference.

STATEMENT REGARDING FEDERALLY SPONSORED RESEARCH OR DEVELOPMENT

Not applicable.

BACKGROUND OF THE INVENTION

Field of the Invention

This invention relates to the field of computer code visualization and more specifically to the field of computer code parsing and indexing to create visual and interactive objects for computer code.

Background of the Invention

As programmers create software products, they typically have a knowledge of how their computer code flows and the logical structures and interconnections between functions. For simple programs, the programmer may have a complete knowledge of each part of the software but for medium to large size programs it may become difficult or impossible to track all of the functionality. Additionally, with teams of programmers working on a piece of software, each group may not understand how the other group's software functions. If a programmer leaves the software project, knowledge of how the program works may leave as well. Although flowcharts and maps have been used previously to chart functions in a program, the complexity of modern software may be prohibitively large to chart or map.

Furthermore, there currently exists no method of visually inspecting large amounts of source code except to read the source code, which typically requires that a programmer is familiar with the language, coding style, and the overall design philosophy behind the software program. Even experienced programmers may have difficulty understanding a particular software program. Additionally, the software debugging tools available to a programmer may not be powerful enough to capture every kind of software bug with granularity.

Consequently, there is a need in that art for improved visualization of software code that enables a programmer to quickly understand the logic and flow of a program and determine if there are software bugs, orphaned code, logical mistakes, human errors, or any unintentional design that might cause the end product to behave unexpectedly.

BRIEF SUMMARY OF SOME OF THE PREFERRED EMBODIMENTS

These and other needs in the art are addressed in one embodiment by a software program comprising a source code parser operable to read a source code file, interpret each line of source code in the source code file, and generate a meta-data file comprising meta-data about each line of source code. The code parser may recursively walk through the source code file to determine interconnections between each line of source code. The code parser may assign a weight to each line of source code based on the complexity of interconnections of each line of source code to generate weighted meta-data. A visualization program may interpret the weighted meta-data and display an interactive visualization to a user.

The foregoing has outlined rather broadly the features and technical advantages of the present embodiments in order that the detailed description that follows may be better understood. It should be appreciated by those skilled in the art that the conception and the specific embodiments disclosed may be readily utilized as a basis for modifying or designing other embodiments for carrying out the same purposes of the present invention.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
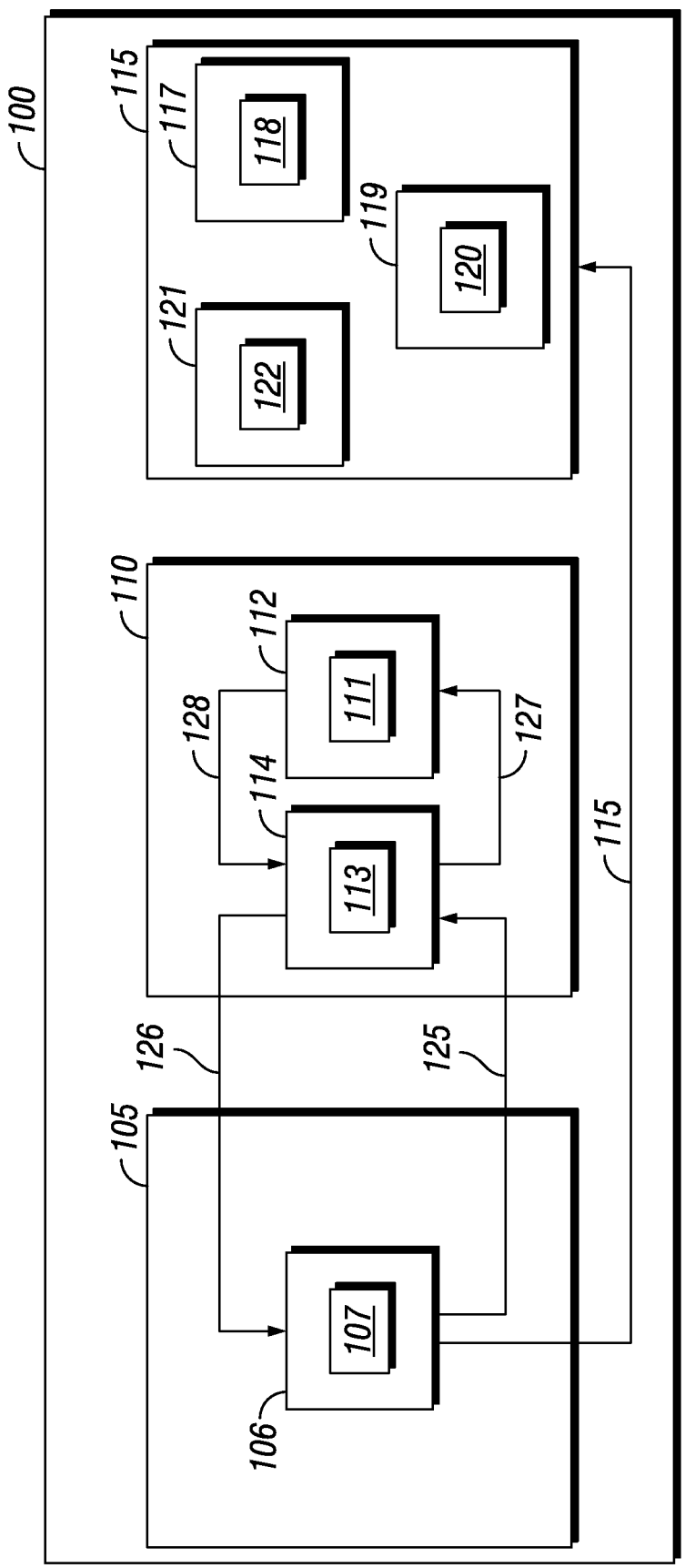
FIG. 1 illustrates a schematic of a program.

As previously discussed the present invention relates to a visual method of displaying source code. A software program may be written in a programming language which is a formal language that specifies a set of instructions that can be used to produce various types of outputs. Programming languages may comprise a syntax or set of rules that define the combinations of symbols considered to be a correctly structured document or fragment of the particular programming language. A programmer may thus create a software program by combining instructions in the correct syntax to achieve a desired result. The list of instructions may be referred to as source code.

A computer's central processing unit (CPU) does not directly run the source code of a program. Rather, the source code is translated into instructions from a higher-level programming language to a lower-level programming language that the CPU can then execute. A CPU may have an instruction set architecture which defines every operation the CPU can perform. The instruction set architecture may be referred to as a machine language as the instructions contained in the instruction set may be directly executed by the CPU. Each instruction in the instruction set architecture may cause the CPU to perform a specific task such as a load, a jump, or add, for example. A compiler may provide translation between the instructions contained in a source code file written in a higher-level programming language to the machine code instructions representative of the instructions. An example of a higher-level programming language may include any language that is not machine code such as C++, COBOL, or java.

A complicating factor in writing software may be that the higher-level programming language used to write the software is a hybrid language between machine code and human language. A programmer may have a conceptual idea of how they want a program to execute but the concept may be lost in translation between human language and the higher-level programming language. Source code may comprise errors and logical mistakes that may be difficult to recognize due to the hybrid nature of programming languages. Unlike written human languages where the meaning of a particular phrase or sentence may be readily understood by simply reading the phase or sentence, a particular line of source code may not readily understood without examining the context the line of code is presented in and the variables within the line of code. For example, first line of code may be a function that calls another function within a second line of code. In order to understand the operation of the first line of code, the operation of the second line of code must first be understood. For a simple program, one of ordinary skill in the art may readily understand functionality of the simple program by reviewing the source code. However, as the number of lines of code increases, it may become more difficult to have a full understanding of what a particular line of code or block of code will output due to the interconnected nature of most programs. For large software projects manual review of each line source code may be impossible.

As one of ordinary skill in the art will appreciate, the terms procedure, function, subroutine, subprogram, method, and other equivalent teiins may refer to any callable subprogram within a larger program. Any particular programming language may have different terminology, rules, and technical effects associated with the terms from another programming language. For example, some programming languages may distinguish between a function which may return a value and a procedure which may perform an operation without returning a value. As used herein, function should be understood to mean any section of a program that performs a specific task regardless of any particular programming language.

A program may comprise an entry point where the operating system transfers control to the program and the program beings to execute. A program may comprise one or more entry points where code execution may begin. In a source code file for a program, an entry point may be the first function that executes. For example in the programming language C, the entry point may be a function called main. The main function in a program written in C may execute which may then call further functions within the program to perform various operations.

With reference to FIG. 1, a schematic example of a program 100 is illustrated. In the present example, program 100 is written in an object-oriented programming programming paradigm. Program 100 may comprise class 105, class 110, and class 115. Each class may comprise objects such as variables, data structures, functions, methods, or any combination thereof. As illustrated in FIG. 1, class 105 may comprise object 106 which may comprise code 107. Class 110 may comprise object 112 and object 114 which may comprise code 111 and code 113 respectively. Class 115 may comprise object 117, object 119, and object 121 which may comprise code 118, code 120, and code 122 respectively. FIG. 1 illustrates only one embodiment of a program. One of ordinary skill in the art will appreciate that a program may comprise any arbitrary number of classes, objects, and code.

In FIG. 1, object 106 may be a main function, for example. Code 107 within object 106 may comprise instructions that call object 114 within class 110. Arrow 125 illustrates object 106 calling object 114. Object 114 may be a function which in turn calls on object 112. Object 112 may be a data structure, such as an array, defined by code 111, for example. Object 112 may pass the requested data back to object 114. Arrow 127 illustrates object 114 calling object 112 and arrow 128 illustrates object 112 returning the requested data to object 114. Object 114 may then perform one or more operations and return the result to object 106 as illustrated by arrow 126. Object 117, object 119, and object 121 may execute within class 115 without being individually called. For example, class 115 may be a class that configures the CPU to output to a user interface, such as a screen. Object 106 may comprise code 107 which calls class 115 to output to the screen the value returned by arrow 126. Arrow 127 represents object 107 calling class 115.

The term "starting point" may be used to refer to a function that calls another function. In FIG. 1, object 112, object 114, object 106, and class 115 may be considered starting points. Object 106 is the main function and is therefore may defined as a starting point by default whereas object 114, object 112, and class 115 may be considered starting points because they are called. However, object 117, object 119, and object 121 may not be considered starting points unless they are called outside of class 115. As will be discussed in detail below, defining starting points may allow a logical tree of function hierarchy to be established.

As one of ordinary skill in the art will appreciate, a single operation performed by computer code may comprise multiple lines of computer code. For example, a do while loop may be represented as:

do{
/*statements*/}
while (expression);.

In the above example, the do loop may be shown as 3 lines of code for ease of visualization. Alternatively, the do loop may also be represented as:

do {/*statements*/} while (expression);.

However many lines of code a particular operation is displayed as in a source code file may be arbitrary and generally may not affect an output or functionality of the operation. For sake of simplicity, when referencing a particular operation in a source code file, the operation may be referenced by the line number where the operation begins. An operation may be any valid command in the particular programming language the source code file is written in. An operation may be, for example, a function, setting a variable, comparing strings, or any other valid command. Furthermore, a source code file may comprise line delimiters that represent the end of a particular operation. Syntax for the line delimiter may vary by programming language. For example, C based languages may indicate the end of an operation with a semicolon whereas python may use a line feed. In the do while statement above, the line delimiter is a semicolon.

In an embodiment, a code parser may take as input a source code file of a program, a compiled source code of a program, such as an executable, a single function, an object, or any other piece of a computer program that comprises computer code. For sake of brevity, the term code will be used herein to mean any code, compiled or not. The code parser may analyze the code and generate meta-data about the code. The code parser may, for example, read the computer code and search for line numbers where operations begin and end as indicated by a line delimiter. Each operation within the computer code may be referred to as a node and be assigned a node ID by the code parser. The entry point of the code may be assigned a node ID of 0, for example, to denote the entry point function as being a parent node of all other nodes encountered. Although any arbitrary node ID may be assigned to the entry point, for ease of understanding, 0 may be chosen. The code parser may read each line of code to generate a node ID for each operation, a parent node ID for each operation, and a child node ID for each operation. Parent node ID represents each operation that calls another operation and child node ID represents each operation that is called by the operation. The code parser may recursively walk the computer code to capture all instances where an operation appears in the source code file. The code parser may store all the generated metadata in a metadata file.

An example metadata file is illustrated in Table 1 below.

TABLE 1

| Line Number | 1 | 6 | 8 | 14 | 23 | 27 |
|---|---|---|---|---|---|---|
| Node ID | 0 | 1 | 2 | 3 | 4 | 5 |
| Parent ID | | 0 | | 1 | 0 | 4 |
| Child ID | 1, 4 | 3 | | | 5 | |

As shown in Table 1, line 1 may be an entry point as evidenced by the node ID being 0 and the parent ID being blank. Node 0 has 2 child nodes which in turn reference back to node 0 being the parent node. As will be appreciated by one of ordinary skill in the art, the methods described herein may allow orphaned code to be readily detected. In table 1, node 2 does not have any parent node IDs or child node IDs associated with it. Node 2 may be considered orphaned code as the computer code associated with node 2 may never execute during the runtime of the program as there is no parent node associated with it.

The code parser may be configured to accept any kind of code including code that is written in different programming languages. As previously discussed, different programming languages may have a disparate structure, syntax, and legal operations. As such, the code parser may be configured to recognize the programming language the code is written in to ensure the code is properly parsed. In some embodiments, the code parser may be able to automatically recognize the programming language and automatically understand the particular syntax of the programming language as well as a list of legal operations and line delimiters. Recognizing the programming language may be necessary to capture all nodes present in a particular set of computer code. The code parser may recognize the programming language by any means such as, without limitation, checking a file extension of the software code file, analyzing the structure of the software code file, checking a file header of the software code file, checking a software code file's meta-data, or from a user's input.

In an embodiment, the code parser may connect to a development environment and request a list of all subroutines in a given program and then recursively request each subroutine called from each of those. The code parser may read the binary data file for the program and generate a list of all jumps and logical connections inside the binary code and generate the metadata file.

As will be appreciated by one of ordinary skill in the art, a software program as a whole may comprise smaller parts that make up the entirety of the software program. For example, the software program may comprise, without limitation, various executables, databases, libraries, scripts, and data files that contribute to the operation of the software program. In general, the various components that make up a software program may be disposed in a file directory accessible to a CPU for execution. In order to effectively connect all parts of a program, the code parser may recursively walk a file directory searching for files that are readable by the code parser. Each file in a directory may be analyzed by the code parser to determine its type and if it may potentially comprise computer code. When the code parser encounters a file it can process, the file may be loaded into memory and executed on by the code parser using the methods previously described.

The code parser may begin to read a file and create a series of data structures in memory, such as a metadata file. The code parser may in addition to recording line number in the metadata file also record the lineage of the node. Lineage may be information about which file the particular node is contained in. As the code parser recursively walks through the directory of files, the metadata file may become increasingly large, eventually containing each operation the software program performs. From the metadata file a tree structure for each node may be created where the program logic is completely recreated without the actual code being present.

As previously discussed, there may be several insights into the analyzed computer code that may be deduced from the metadata. For any given node that does not contain a child node or a parent node, the code defined by the node may be considered orphaned code. Orphaned code may contribute to bloat in a program and in general may be removed without affecting the runtime of the software. Other insights that may be gained include determining if a particular piece of code is stolen or misappropriated. For two disparate software programs, it may be unlikely that any two grouping of nodes contain the same program logic. Some nodes may be identical or nearly identical between software programs that reference the same libraries. However, in the aggregate, it may be unlikely that entire groups of nodes share the same dependencies between parent nodes and child noes unless the code that was parsed to generate the noes is substantially similar. Using the methods described herein may provide a tool to aid in determining if trade secret misappropriation has occurred, if copyrights have been violated, or if a particular piece of code is potentially stolen.

Other potential insights may include if a particular program is compliant with regulatory standards. Some industries may be regulated for compliance with standards and practices set out by regulations or statute. For example, the Securities and Exchange Commission may require certain businesses to be compliant with the Sarbanes-Oxley Act. To prove compliance, a software program may be passed through the code parser previously described and then compared to regulations to prove compliance. A regulatory body may, for example, provide an example program which is compliant with regulatory standards. The example program may be parsed and a metadata file may be created as previously described. The software program which is to be checked for compliance may also have a metadata file prepared. Program logic from the software to be checked for compliance may be readily compared to the example program by comparing the metadata file from the example program and program to be checked for compliance.

Another potential insight may be to analyze obfuscated code. Obfuscated code may be code that is deliberately difficult for a human to understand through the use of confusing variable naming, roundabout expressions, abnormal syntax, and other techniques known in the art. The code parser may aid in allowing a user to better understand how the obfuscated code works by removing all the components that make the obfuscation effective by creating the metadata file with only the logical constructs of the obfuscated code. Whereas an obfuscated code file may contain confusing jumps, for example, the metadata file would contain the interconnection between nodes of the obfuscated code making the connection between nodes clear.

Another insight may be management of programming teams. The techniques described herein may allow a manager, for example, to analyze a portion of code to quickly identify which portions are modified. The techniques described herein may also aid in identifying relative contributions of each member of a programming team. Each member of a programming team may have their code analyzed using the techniques described herein which may allow a manager to see which members of a team are the most effective. Additionally, code may be analyzed for resource heavy functions such as recursion and other potential points of optimization. Marketing and product management teams may use the techniques described herein to better market the software product by showing a potential client the capabilities of the software without the client reading individual lines of source code. Additionally, the techniques described herein may identify code with structural similarities. Structurally similar code may give a programmer a starting place to perform optimizations to simplify the code.

As previously mentioned, the methods described herein may comprise a code visualizer. A visualizer may then read and analyze the meta-data and produce a visual representation of the meta-data to a user. A user may interact with the visual representation and manipulate the representation to fit the user's needs. For example, the user may select criteria which may exclude some meta-data thereby adjusting the visual representation. To more readily display the functionality of the software to a user, the code parser may generate a weight for each node and store it in the metadata file. Weights of nodes may be calculated by the number of calls each node makes as well as the sum of the calls made by each child node associated with the node. Calculating a weight may allow the visualizer to assess the importance of each node and how to best display the node to a user. During parsing, it may not possible to calculate the exact weight of a particular node since it may not be known how many child or parent nodes the node is associated with until the entire source code is parsed. For some simple functions, such as a loop that only sets a variable for example, weights may be calculated during parsing. However, for more complex functions, the weights for each node may require calculation after parsing is complete.

Once the code parser has read each source code file, the visualizer may interpret the meta-data files and generate a visualization of the code. The visualizer may perform a number of analytical processes on the meta-data. For example, it may search for the functions with the largest weights. The weight of a function may give an indication of the importance of the function in the program. For example, large weight functions may be the most important functions in the overall program as they are the most involved with the functioning of the software. Furthermore, nodes with a relatively larger weight may the parts of the program which took the most time to write which may indicate relative importance. By visualizing the heaviest functions, a user may more readily understand the more complex portions of the code.

Figure 2:
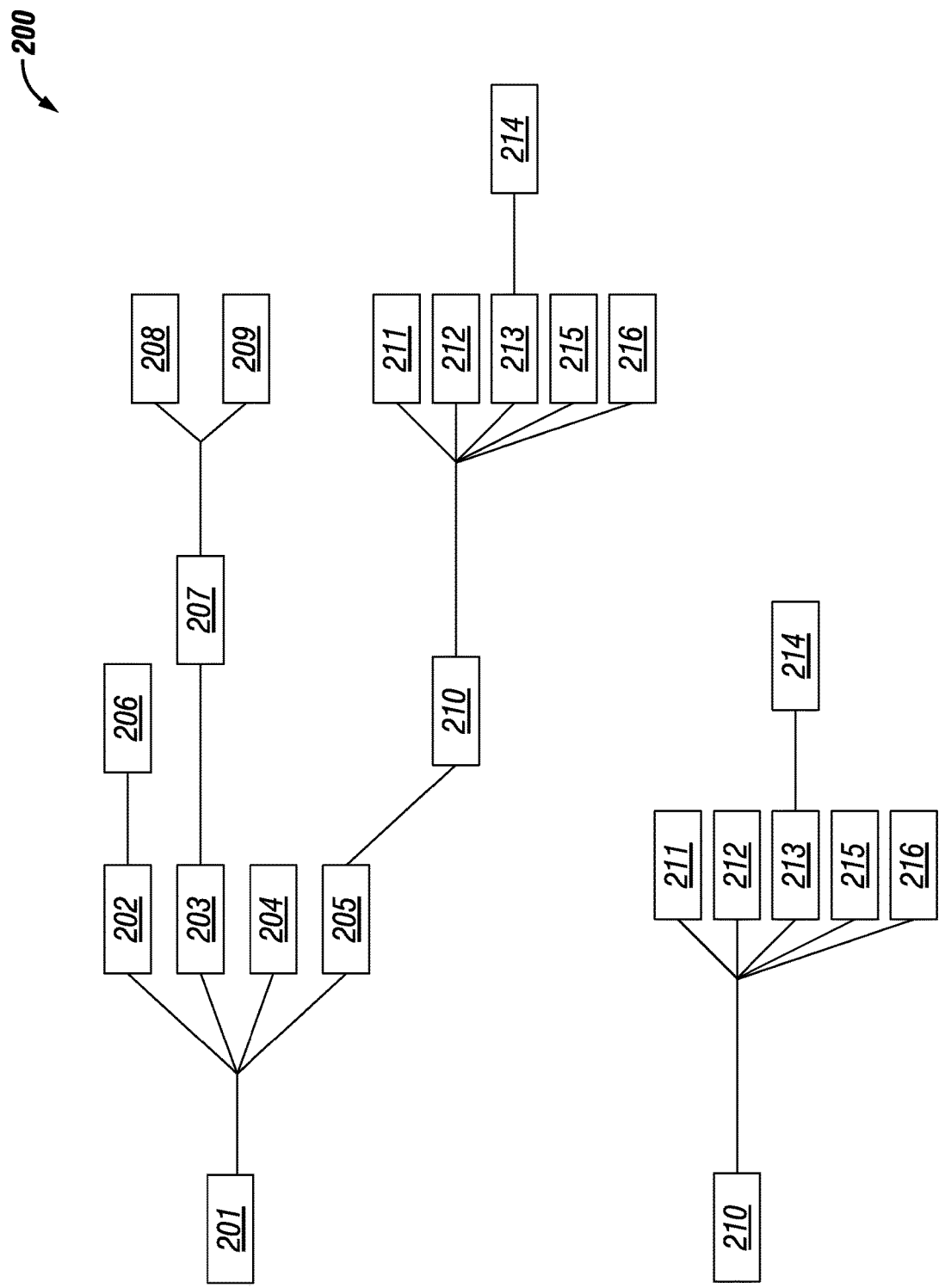
FIG. 2 illustrates a tree.

A wide variety of visualizations may be generated depending on the user's needs. For example, a "tree" of nodes may be displayed. FIG. 2 illustrates and example of a tree 200. As illustrated, tree 200 may comprise nodes 201 through 214 which may be functions, loops, variables, or any other legal operations in the programming language the source code tree 200 represents is written in. A user may be able to use tree 200 to inspect the logical flow of operations of the underlying source code without the need to actually read each individual line of code. The visualizer may generate tree 200 based on a metadata file created from a source code file for a program. The visualizer may read the source code file, check dependencies of each node based on the indications of child nodes and parent nodes and generate tree 200. As illustrated, node 201 may be the entry point for the software program. Node 201 may be identified as the entry point because every other node is dependent on node 201. The metadata file for node 201 would indicate nodes 202, 203, 204, and 205 as being child nodes of node 201. Node 210 and its corresponding child nodes is illustrated twice in tree 200. As previously discussed, a program may have certain functions that may be referred to as starting points because the functions may be called within the particular source code file, or externally from the source code file, such as by another part of the software program. Node 210 is a starting point in tree 200 and may therefore be shown twice to indicate that it is a starting point. If, for example, node 210 did not appear as dependent from node 201, node 210 may not be used anywhere in the software program.

The design of the visualization of the code tree in three dimensional space may be adjusted to fit a variety of scenarios or objectives. A class tree may look more like a series of increasingly faded copies of itself, while a logic tree might look more like a circle with nodes coming off of itself. In a particular embodiment, the lowest level of the visualization tree may represent the higher functions, so functions may displayed like a tree in the real world, with the root indicating the entry point of the function tree. The visualization may be rotated, scaled, or adjusted such that the visual display is presented upside down, while the lower functions may hang down like roots from a tree. In this manner, if function A calls function B, which calls function C, there may be no longer a need to display function B calling function C as a separate tree, nor may there be a reason to show function C on its own. This method of visualization may inherently shows usage, which in turn may allow the developer to not only see the heaviest usage, but may also show unused functions on their own. This may allow to see orphaned code that is no longer in use.

Other types of visual data display are also possible, such as the display of the interaction of two types of code. In an embodiment, a client and server may communicate. One tree representing a client function may show an "end point" where the data is passed to the server, while a visual indicator, such as a colored line, may show that data being transferred to the server code. A second tree for the server code may then show how that data is used, and show the return data. In particular, such a server-client visualization may provide information about database usage among other resource monitoring tasks. Additionally, the method of metadata visualization may allow easier understanding of complex systems with different computer code languages interacting at different steps. In the case of a client/server, the client may use a web browser built with JavaScript, C++, and XUL which interfaces with a server coded in C and XML which in turn interfaces with a database coded in SQL. The complex relationship between each step may be impossible for a human to conceptualize, much less monitor. Visualizing metadata generated by parsing each program (browser, server, database) may simplify the task of debugging and allow a programmer to instantly visualize complex functions.

Figure 3:
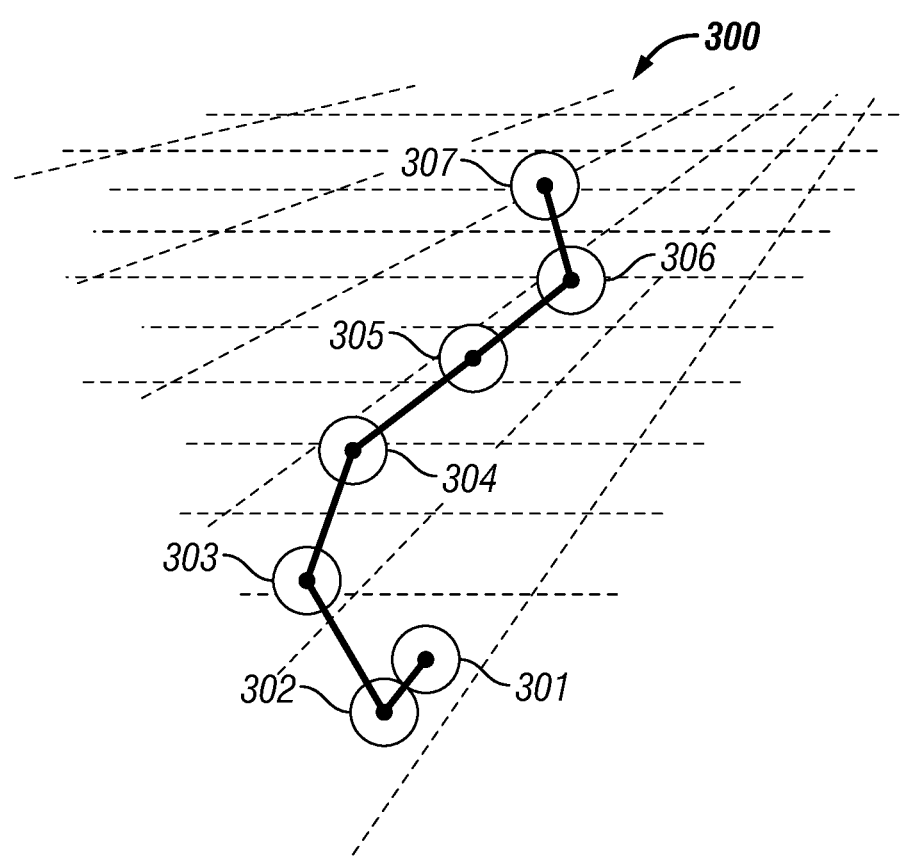
FIG. 3 illustrates a metadata visualization.

FIG. 3 illustrates another example of a visualization 300 generated from a metadata file. Visualization 300 may comprise nodes 301-307 arranged such that the lineage of each node from the metadata file is visually illustrated. Node 301 is a starting point in visualization 300. A starting node may be identified by a different color than the other nodes or by being represented as being closest to the bottom of visualization 300, or by any other means. Visualization 300 illustrates each node as a circle, however, the nodes may be represented by any shape. The nodes may be connected by lines, which may represent communication between the nodes. In this manner, a map is produced showing the relative connection of each function. A user may then visually navigate the map and see all the functions rather than reading the functions in the original source code. For instance, lines on this map connect nodes. The entirety of a program may be displayed and viewed in this manner. A user may further zoom into areas of interest. Selecting a node may bring up an information dialog for that node, which may link to the source code itself and provide additional information.

Figure 4:
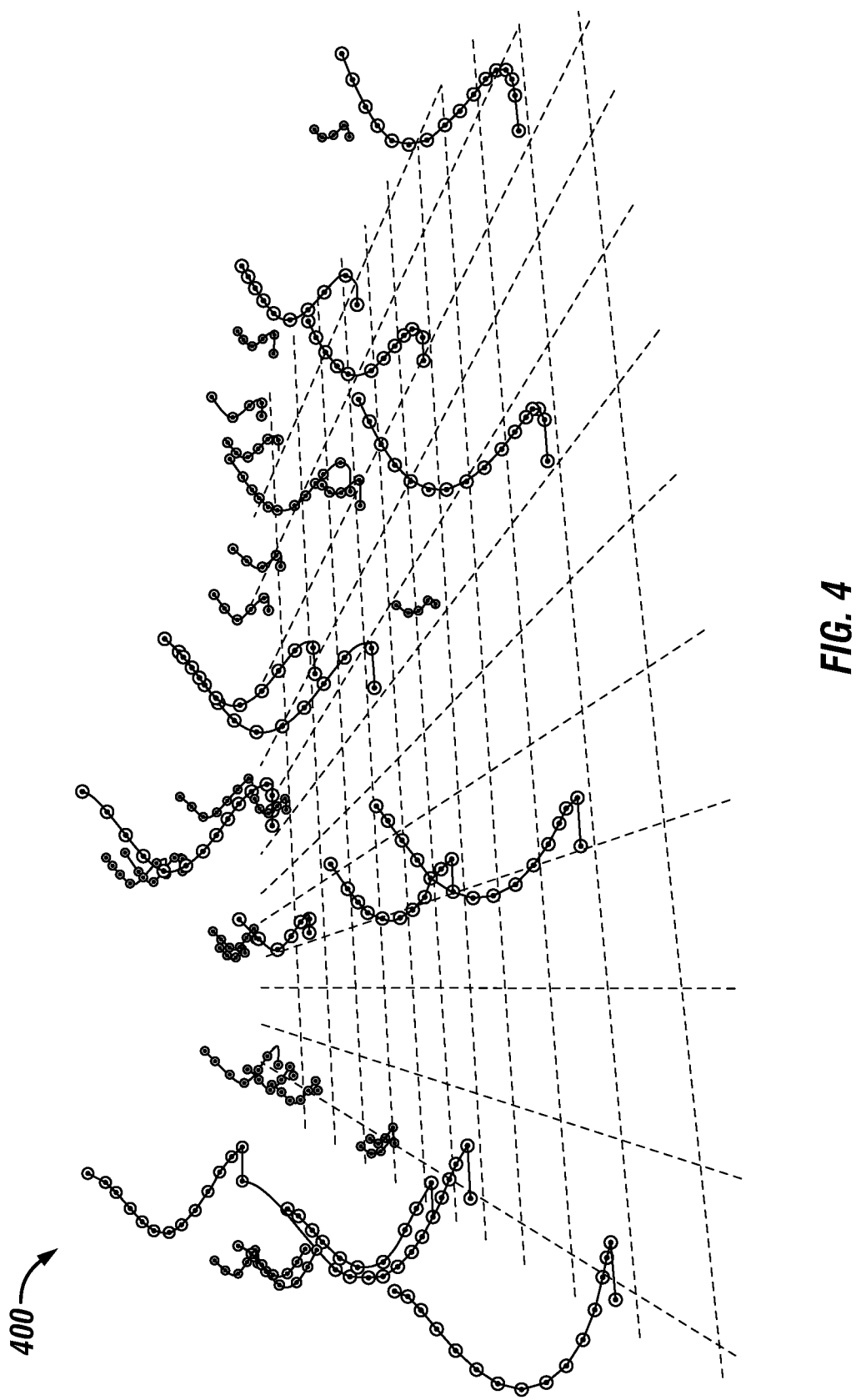
FIG. 4 illustrates a metadata visualization.

FIG. 4 illustrates a more advanced visualization 400 generated from a metadata file. FIG. 4 illustrates a plurality of staring point nodes and their corresponding child nodes connected by lines. The visualizer may analyze metadata from the metadata file to generate visualization 400 of the metadata. FIG. 4 illustrates starting point nodes displayed on a grid with dependent child nodes as circles with interconnected lines above the grid. In this embodiment, lines represent connections between objects. In an object oriented programming language, objects may be interoperable and there may be only one instance of each object on the grid with lines crisscrossing each other between objects, or arcing over the tops of other objects. From each node, the logical flow of the source code is displayed with a vertical climb for each successive step through the source code. The logical flow from any one point in code to another, if such a pathway exists, may be viewed directly, and complexity may readily be identified by looking for the visibly tallest structures. The visualization may be manipulated to for example, display a single starting point node and all subsequent functions that are connected to the starting point node. Alternatively, all the starting point nodes and dependent child nodes may be displayed at one time.

In another embodiment, a code check-in system may be provided by the visualizer. In an embodiment a ground plane may be displayed with a group of parent nodes and child nodes displayed therein. Color coding may allow a user to see changes to the code between two source code repository check-ins. Some nodes and links may be color coded to indicate that they were removed, some may be color coded indicating they were changed, and may be color coded indicating they are new. Additional colors may be used to indicate additional features of the check-in system including code conflicts and blames.

In an embodiment, a checkpoint function may be added to points of interest in the source code file to monitor the execution path of the program. For example, a function that sets an unused variable or advances a counter or any other function may be used. When the parser recursively walks the file directory, each occurrence of the checkpoint function may be logged into the metadata file as a child node. The visualizer may recognize the checkpoint function and thereby provide the user with the ability to see every time the checkpoint function is referenced. The visualizer may display each occurrence in sequence, allowing a user to watch the progression of data across all visible nodes. The visualizer may, for example, animate a logical path from node to node following the execution path where the checkpoint function is referenced. The execution path may look like a path of lightning along the limbs of a tree, for example. A user may easier follow the program logic and be therefore become aware of how a programming error or bug manifests. If, for example, the program runs out of system resources such as memory, the programming error may be readily recognized through setting the checkpoint function at a suspected problem area in the code.

In another embodiment comprising the checkpoint function, all areas of the visualization may be initially one color, and a slider or other input may allow a user to monitor a logical path. As the slider or input is modulated, a logical path from one node to another may change color, such as to red, for example, with red connections between the nodes. This methodology may allow a user to visually monitor an program's behavior. The nodes may be illuminated based on an external connection, pipe, or file, so the user may either monitor the program in real time or play it back at a later time. In the event the user needed to play back a recording of the logic, additional code may be inserted into the source code that may log function calls serially. This may allow a user to then view those changes by loading a metadata file.

In another embodiment, the user may use this to view the interaction between two different languages, two different instances of the same program, two different products, or client server combination. In this embodiment, two ground planes may be visible, with source code displayed as illustrated above, with the additional change that some nodes from one ground plane may connect to nodes on the other ground plane, indicating communication. In this way, a user may see the way a server communicates with a client, or a database communicates with a server. It may also be used to bridge the gap between two different languages. Lines in this case between the two sets of source code would be displayed in a different color so they can be readily seen by the user.

In another embodiment, the visualizer may color high resource use components of code such as recursion and destroying objects before they are used. These kinds of issues may be highlighted in a different color, so a user may readily identify them. A third dimension may be used to display flags and structures indicating file ownership, classes, namespaces, and other contextual information. The size of these structures may be scalable such that more complicated nodes may be displayed as larger structures. These structures may be in the form of organic tree-like paths or large blocks.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of computer code visualization, the method comprising:
  parsing a source code file comprising computer code;
  identifying an operation in the source code file;

assigning a node ID to the operation;
considering whether the operation has a parent operation that calls the operation or a child operation that is called by the operation;
generating a metadata file, the metadata file comprising:
  the node ID for the operation;
  a parent node ID, comprising the node ID for the parent operation;
  a child node ID, comprising the node ID for the child operation;
  or any combination thereof; and
generating a visualization from the metadata file.

2. The method of claim 1, wherein the step of identifying the operation comprises:
  parsing consecutive lines of code in the source code file until a line delimiter is reached, thereby identifying the operation bounded by a first line of code from the consecutive lines of code and the line delimiter.

3. The method of claim 2, wherein the line delimiter is programming language specific.

4. The method of claim 2, wherein the step of parsing consecutive lines of code comprises generating a string from the parsed code and storing the string in memory.

5. The method of claim 4, further comprising:
  comparing the string against a list of valid operations for a programming language the source code is written in, and determining if the string comprises a valid operation.

6. The method of claim 5, further comprising:
  identifying an arguments list from the string if the string contains a valid operation and writing the arguments list to the metadata file, thereby associating the arguments list with the node ID of the operation.

7. The method of claim 1, wherein the step of generating a metadata file comprises:
  identifying each operation in the source code file;
  assigning each operation a node ID;
  determining if an operation is a dependent operation;
  associating the node ID for each dependent operation with the node ID which the operation depends from, thereby indicating the dependent operation as a child node ID associated with the a parent node ID from which it depends.

8. The method of claim 1, wherein the step of generating a visualization from the metadata file comprises:
  displaying each operation as a connection of nodes, the connection of nodes being defined by connecting each parent node ID to each child node ID.

9. The method of claim 1, further comprising:
  calculating a weight of each node ID.

10. The method of claim 9, wherein calculating a weight comprises:
  summing the number of child IDs associated with a parent ID.

* * * * *